United States Patent [19]
Mitchell

[11] 3,829,211
[45] Aug. 13, 1974

[54] EASEL CONSTRUCTION

[76] Inventor: Robert W. Mitchell, 707 Myrtle Ave., St. Joseph, Mich. 49085

[22] Filed: Feb. 28, 1973

[21] Appl. No.: 336,884

[52] U.S. Cl. .................................................. 355/74
[51] Int. Cl. .......................................... G03b 27/58
[58] Field of Search ............................... 355/72, 74

[56] References Cited
UNITED STATES PATENTS

| | | | |
|---|---|---|---|
| 2,167,298 | 7/1939 | Hardy | 355/72 |
| 2,298,583 | 10/1942 | Mullan | 355/72 |
| 2,915,941 | 12/1959 | Finbers | 355/72 X |
| 3,409,359 | 11/1968 | Mullan | 355/74 |
| 3,644,036 | 2/1972 | Canfield | 355/72 |
| 3,682,547 | 8/1972 | Rotowsky | 355/74 |

FOREIGN PATENTS OR APPLICATIONS

| | | | |
|---|---|---|---|
| 1,052,713 | 9/1953 | France | 355/74 |
| 623,320 | 5/1949 | Great Britain | 355/74 |

*Primary Examiner*—Joseph F. Peters

[57] ABSTRACT

An easel construction for use in a darkroom and a method of using it which enables multiple exposures to be made on a single sheet of photographic paper in a series of simplified steps, the easel construction comprising a base, a plurality of interchangeable covers adapted to overlie one surface of the base and a lid or similar securing means for maintaining the covers in place over the base. A focusing target surface having delineated surface areas corresponding to the areas of the covers is formed on a second outer surface of the base. Prior to exposing areas of the photographic paper, the image to be printed is properly focused on a target surface area and the lense aperture adjusted, the easel is inverted and one or more corresponding areas of photographic paper retained on the opposite side are exposed after removal of an appropriate cover. The covers are uniquely configured to avoid double exposures and facilitate the desired print sizes and after complete exposure the entire sheet of sensitive paper is removed, chemically processed, and if desired, cut to form a plurality of individual prints.

17 Claims, 6 Drawing Figures

PATENTED AUG 13 1974 3,829,211

EASEL CONSTRUCTION

BACKGROUND OF THE INVENTION

1. Field of the Invention

This invention relates to a novel photographic easel construction for use in the darkroom which enables a plurality of separate pictures to be efficiently made on a single sheet of photographic paper and a unique method of exposing such prints.

2. The Prior Art

It is well known that color printing paper requires considerable processing time to develop. If a number of pictures can be exposed and developed on a single sheet of photographic paper, total processing time and cost per picture may be considerably reduced.

Certain easel constructions of the prior art enable multiple exposures to be made on a single sheet of photographic paper. Thus, Hardy U.S. Pat. No. 2,167,298 discloses a printing frame on which a sensitized paper is moved relative to a fixed exposure opening in the frame. If the size of the picture formed by exposure through the fixed exposure opening is to be other than the size of the opening it is necessary that masks be employed which effectively reduce the size of the single opening. Utilizing the easel of this invention pictures of varying size may be readily exposed onto a single sheet of photographic paper as will hereinafter be described in detail.

Finberg U.S. Pat. No. 2,915,941 discloses an easel construction for forming multiple pictures on a single sheet of photographic paper; however, the pictures formed are of a single size. The Finberg apparatus is intended to form a plurality of identical pictures such as wallet-size photos on a single strip of printing paper by moving the paper in the easel.

Other easel constructions more complex in structure and more expensive to manufacture are known in the art which lack the flexiblity inherent in the easel hereinafter described.

SUMMARY OF THE INVENTION

It is an object of this invention to provide an easel construction which, although simple in details of construction, enables a plurality of prints, which may be uniform or of varying size, to be printed in contiguous relationship on a single sheet of photographic paper, processed as a unit and subsequently separated into individual prints if desired.

It is another object of this invention to provide an easel construction which enables a plurality of pictures to be formed on a single sheet of photographic paper in contiguous relationship and which can be readily manipulated in total darkness, if desired.

It is a further object of this invention to provide an easel construction which enables various combinations of pictures of different sizes to be printed readily on a single sheet of photograph paper. Such flexibility in printing enables maximum utilization of photograph paper, easier handling of larger sheets of sensitive paper, the development of all pictures of the exposed paper efficiently and simultaneously, and the elimination of any precutting. Such simultaneous handling and development reduces the time and expense of processing.

In accordance with one embodiment of this invention, a frame encompasses a base for mounting photographic paper with a hinged lid overlying the base and frame. A plurality of opaque covers of predetermined size snugly fit in the frame over a paper-holding surface of the base and beneath the lid. The lid, when closed, retains the covers in a rigid, light-tight assembly with the base. A target is formed on the outer opposite base surface and in the preferred embodiment the appropriate picture sizes are delineated on the opposite base surfaces to correspond to the dimensions of the opaque covers.

In normal use the image of a negative mounted in an enlarger is focused on an appropriate delineated area of the base target surface while the easel is supported on an enlarger table. After proper focus is obtained on the target surface the easel assembly is inverted, the lid opened and the negative image located on the opaque cover of appropriate size. The cover is then easily removed and the desired exposure made on the photographic paper segment initially underlying the removed cover. The easel construction is designed so that the target surface is at exactly the same distance from the negative during focusing as is the light sensitive surface of the paper when the easel is inverted on the enlarger table for exposure of the photographic paper. The opaque cover removed during exposure of the selected segment of the sensitive paper is inverted, to indicate exposure of the paper beneath it, and replaced over the exposed paper segment. The process is repeated in a manner to be described in greater detail until all of the segments have been exposed. The resulting integral sheet will have a plurality of exposures thereon in continguous relation all of which may be simultaneously developed.

For a more complete understanding of this invention, reference will now be made to the drawings and the following description which explain the operation of the easel in detail.

DESCRIPTION OF THE INVENTION

Figure 1:
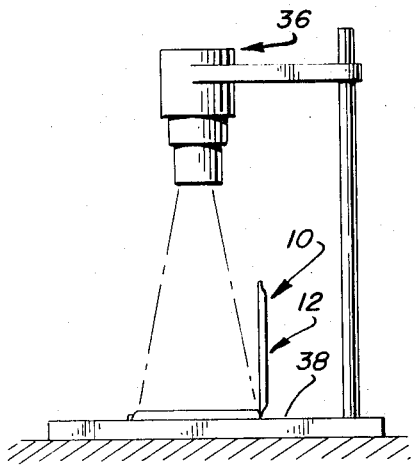
FIG. 1 is a side elevational view illustrating an easel made in accordance with this invention disposed on an enlarger table in the course of exposing photographic paper mounted therein.
Figure 2:
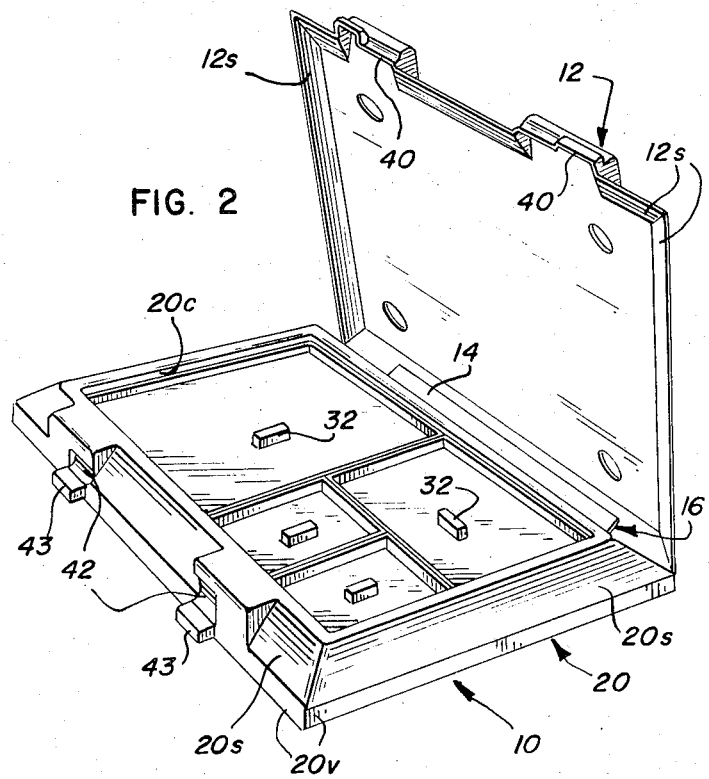
FIG. 2 is a perspective view illustrating an easel made pursuant to this invention with the lid thereof in the open position.
Figure 3:
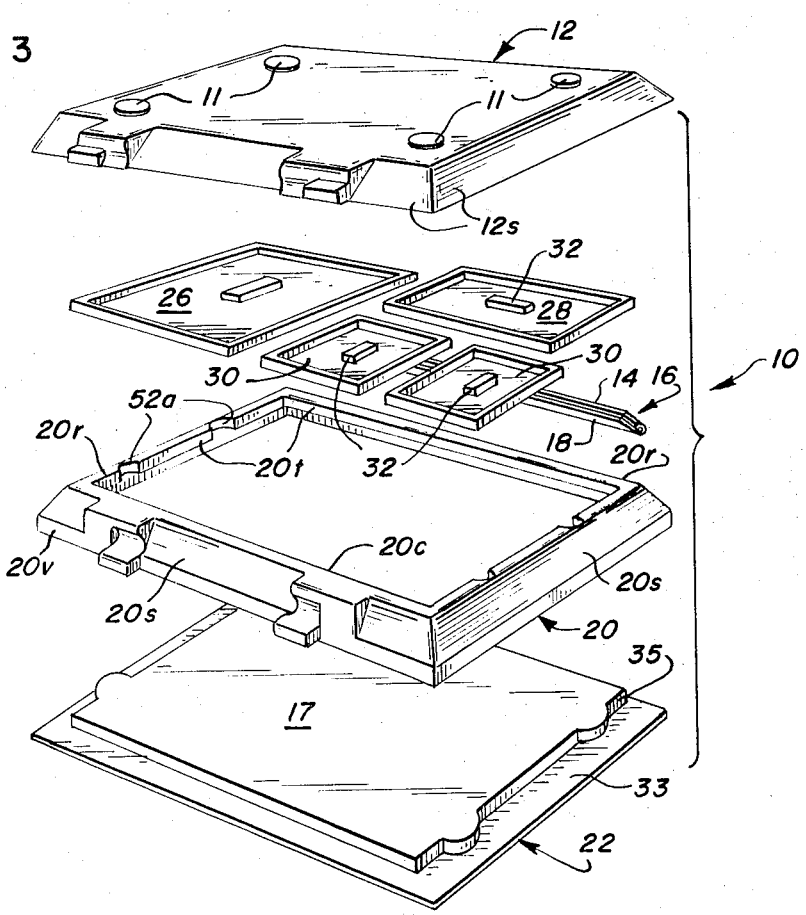
FIG. 3 is an exploded view illustrating the basic components of one embodiment of an easel construction made pursuant to this invention.
Figure 5:
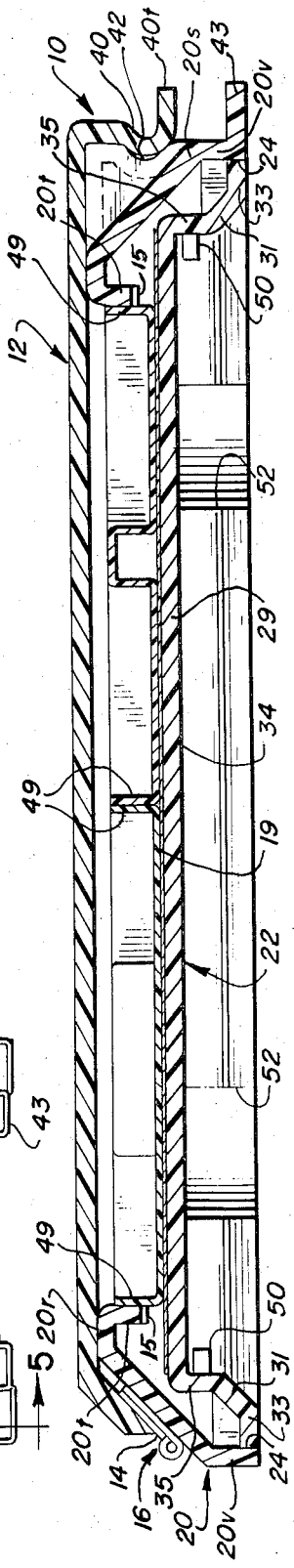
FIG. 5 is a sectional view taken on line 5—5 of FIG. 4.

Referring now to FIG. 2, an easel 10 made in accordance with this invention is illustrated with a lid 12 thereof in an open position. Lid 12 is secured to upper leaf 14 of hinge 16 by riveting, cementing, or other suitable means of attachment. As shown in FIGS. 3 and 5, lower hinge leaf 18 is adapted for suitable attachment to a longitudinal side portion of frame 20. Lid 12 is free to move pivotally by means of hinge 16 from the raised positions seen in FIGS. 1 and 2 into the closed nesting position over frame 20 as illustrated in FIG. 5. It will be noted that four side portions 12s of the lid 12 and four side portions 20s of the frame 20 upwardly converge as the frustum of a rectangular cone so as to be snugly inter-engageable in a nested condition when the lid is closed. The surface-to-surface engagement between side portions 12s of the lid and side portions 20s of the frame insure a relatively light-tight seal when the lid is closed. The buttons 11 provide a footing for the easel and localize any wear or deterioration due to sliding.

Frame 20 defines a central opening 20c which exposes the underlying base 22. Opening 20c is surrounded by a shallow vertical flange 20t, which in turn is connected through a narrow frame rim 20r to the sloping sides 20s. The sloping sides 20s have a relatively narrow vertical extension 20v which supports the easel 10 on a work surface.

The base 22 has a peripheral flat portion 33 connected through a conic portion 31 to a vertical border rim 35 (see FIGS. 3 and 5). The rim 35 supports the central web 29 having a paper supporting surface 17. The paper supporting surface 17 is larger than the opening 20c in frame 20 and is spaced from the vertical flange 20t along the two long sides to receive the sensitive paper, such as sheet 19 shown in FIG. 5, in the slots 15 defined thereby.

The two short sides of the flange 20t engage the central web 29 and the peripheral flat portion 33 of base 22 engages the vertical extension 20v of frame 20 about the entire periphery. These abutting portions of base 22 and frame 20 may be secured together electronically, chemically, by sonic welding or by any other appropriate means along the contact surfaces 24. This welded construction is tubular in nature and is then quite rigid and resistant to warping or other distortion.

Snugly receivable within the upper opening defined by terminal edge portions 20t of frame 20 and adapted to rest over the light-sensitive surface of photographic sheet 19 are opaque covers 26, 28 and 30. The covers may be formed of plastic, wood or other suitable material which does not transmit light. Each cover 26, 28 and 30 has a raised handle projection 32 and may be colored white on one side and black on the other to indicate the non-exposed or exposed condition of the segment of paper 19 therebeneath.

Figure 4:
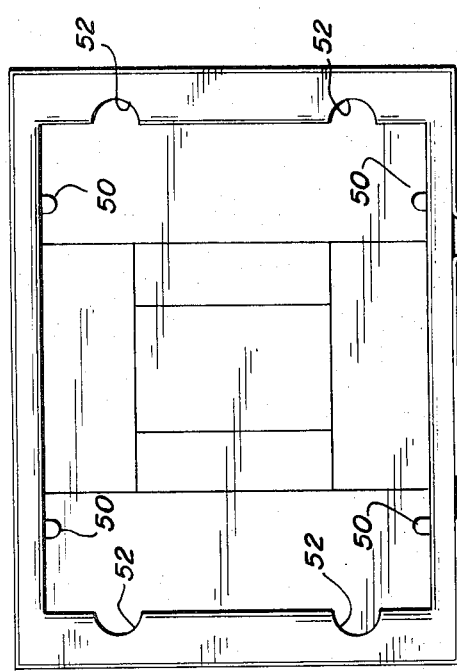
FIG. 4 is a bottom plan view of the easel of FIGS. 1-3.

Oppositely disposed to surface 17 and defining the bottom surface of the web 29 of base 22 is target surface 34 as shown in FIG. 4, the surface has outlined thereon various areas corresponding exactly to the areas of the covers 26, 28 and 30. Although cover 26 comprises approximately one-half and the covers 28 and 30 one-quarter and one-eighth, respectively, of the area of the underlying sheet 19, such relationship is given by way of example only. However, the advantages of the relationship are many. For example, the covers can all be removed to make one full size print. A full set of covers might consist of: two half sheet, four quarter sheet and eight eighth sheet covers which could then be used in any combination. The frame is preferably sized to match a standard available sheet size of sensitive paper. Assuming, for example, sheet 19 is 8 × 10 inches, approximately one-half inch of paper extends into each slot 15 and thus cover 26 would be 5 × 7 inches and the other covers 28 and 30 sized accordingly.

In the normal course of use, an image projected through a negative supported on an enlarger such as enlarger 36 of FIG. 1 is located on a desired area of target surface 34 while the easel assembly 10 is supported in an inverted position on a support such as table 38 of FIG. 1. After the image is properly focused on the desired delineated area on surface 34, which by way of example corresponds to the area of cover 26, and the lens adjusted for exposure, the easel assembly 10 is inverted and the lid 12 opened to assume the condition of FIG. 1. Cover 26 is then brought into underlying, coinciding relationship with the projected image while the assembly 10 is supported on the table 38. The enlarger turned off, the cover 30 is removed and the exposure made on the underlying light-sensitive paper surface. It is apparent from FIG. 5 that following inversion on support table 38 the light-sensitive surface of paper 19 will be at exactly the same distance from the negative in the film holder of enlarger 36 as was the surface 34 during the initial focusing step. Thus no re-focusing is necessary but only the shifting of the easel to project the image on the desired cover. Following exposure the cover 30 is inverted to indicate exposure of the underlying segment of paper and replaced over the exposed segment of sheet 19. The handle portions 32 of the covers are so shaped that even in total darkness it is easy to identify the segments of the paper already exposed. If a different print size is then desired, the easel assembly is then inverted for projecting the subsequent desired picture on the target surface, after which the assembly 10 is inverted again, the lid 12 opened and the second exposure made on sheet 19 after locating the easel properly and removal of the desired cover.

Curved detent portions 40 of lid 12 are frictionally received in mating recesses 42 of frame 20 as is most clearly seen in FIG. 5 to form a lid locking mechanism. Terminal edge portions 40t of detents 40 in combination with underlying projecting lips 43 of frame 20 facilitate opening action of the lid which may be readily effected by a finger-actuated flipping action.

It is seen from FIG. 5 that the snug assembly of parts in combination with the locking detents 40 prevent relative movement between easel components in the course of inversion in normal use.

The easel elements illustrated in FIG. 3, with the exception of hinge 14, may be vacuum formed from high impact polystyrene although other suitable materials may of course be employed.

Target surface 34 may also serve as a support surface for supporting a full sized sheet of photographic paper to be exposed. Opposed paper retainers 50 (see FIG. 4) may be disposed along opposed edges of surface 34 to lockingly position and hold down a sheet of paper to be exposed. Following exposure, curved finger recesses 52 facilitate removal of the exposed paper from retainers 50. Similar curved finger recesses might be located at 52A for removing paper from the other surface of the base.

As shown in FIG. 5, the handles 32 are integrally formed as by vacuum holding and are readily engageable with the fingers for removal at the time of actual printing. When the covers 26, 28 and 30 are repositioned following exposure in the inverted position, manual removal of a single cover 26, 28 or 30 by inserting a finger in the hollow formed by the handle is relatively difficult and possibility of mistake or double exposure is minimized.

Also, as shown best in FIG. 5, the flanges 49 formed on the edges of each of the covers 26, 28 and 30 assist substantially in excluding spurious light and especially any light which is not striking the print substantially normal to the surface of the sensitive paper 19.

The covers are preferably made of dark material, preferably black so that spurious light is also absorbed thereby. The upper or open surface should be colored white for positioning the image for exposure.

Figure 6:
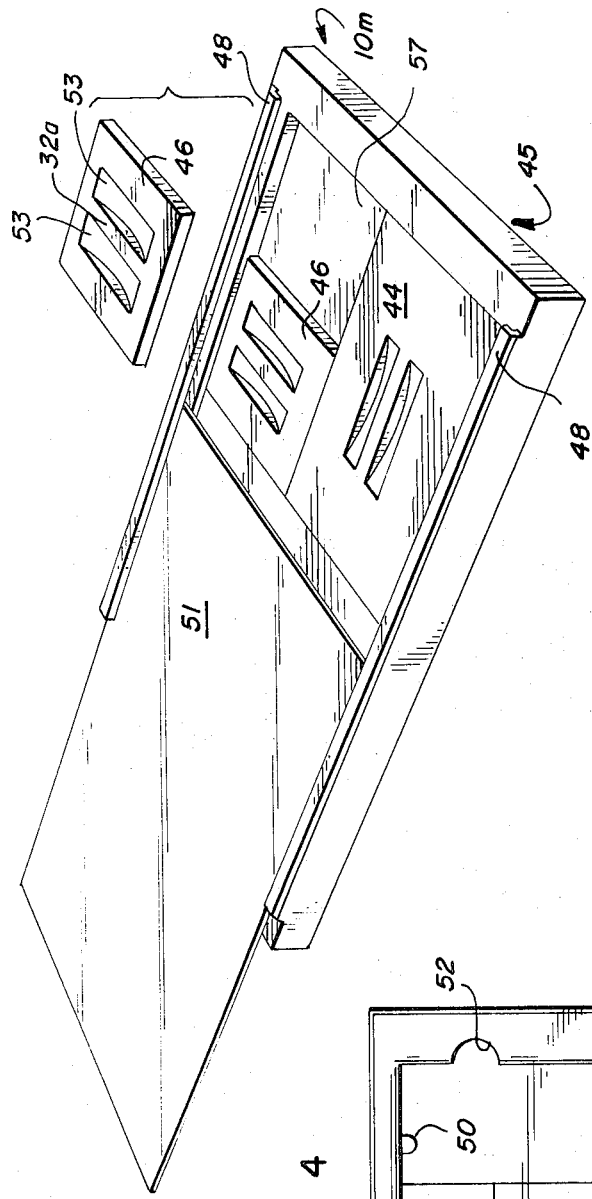
FIG. 6 is a fragmentary perspective view of a modified easel construction made pursuant to this invention.

FIG. 6 illustrates a modified easel 10m in which frame 45 and covers 44 and 46 may be fabricated of wood or other solid materials. Opposed slotted guides 48 may receive a plate lid 51 which retains the covers in assembled condition with frame 45. Plate 51 thus functions in the same manner as hinged lid 12 of easel 10.

Because the easel 10m of FIG. 6 is made of solid rather than sheet materials, the handles 32a are formed of two adjacent arcuate slots 53 and removal of a cover once it has been inverted, without removing all covers, is more difficult. Longitudinal slots like the slots 15 in FIG. 5 are formed in the wood or other solid material to facilitate holding the sensitive paper.

The opaque cover pieces and target segments 44 and 46 disposed on surface 57 of base 45 may comprise any desired fraction of the sheet to be exposed.

The precise location of the exposures made on the light-sensitive surface of paper 19 enables a plurality of contiguous pictures to be developed from a single sheet of paper. The pictures having no border therebetween may remain as an integral assembly, or if desired, the pictures may be cut from each other. If borders are desired appropriate paper border mats may also be employed directly over the sensitive paper. Regardless of the final picture product, developing time is minimized by simultaneously developing the plurality of pictures on a single sheet of sensitive paper.

In summary, a unique easel is provided by this invention in which a standard sheet of sensitive paper can be held in a flat position against a printing surface. A plurality of rectangular covers can cover the paper, be removed in a predetermined sequence, and replaced in an inverted position. Thus, many prints can be made quickly and efficiently.

Thereafter the entire sheet may be removed and processed as a unit and then, if desired, cut into individual prints.

In the preferred form illustrated, two covers equal the total size of the sensitive paper, while four more covers equal the frame area and eight more are equal to the total area. Any number of prints from one to eight or more can thus be produced on a single sheet by proper exposure, image adjustment and cover maneuvering.

In the preferred embodiment the number of prints made from a single sheet of material will equal $2^n$ where $n$ is any whole integer. However, two or more of the areas may be combined in side-by-side or end-to-end relationship in a special cover for some special purpose.

The invention is well adapted for use with any desired number of covers 26, 28 and 30. For example, in an embodiment for use with 11 × 14 sensitive paper it is desirable to have one-half inch of paper in each slot 15, thus providing 16 exposures utilizing the same 2 ½ × 3 ½ inch covers utilized with the 8 × 10 embodiment described above.

I claim:

1. An easel construction comprising a paper supporting base having one surface adapted to hold photographic paper to be exposed, a plurality of close-fitting, opaque covers adapted to interfit in close contiguous relationship with no interval therebetween, removably positionable in said close relationship on said one surface, securing means movable over said covers and connected to said base for locking said covers in place over said one surface; and target means disposed on a second outer surface of said base dividing said second surface into area segments corresponding to the areas of said covers disposed on said one surface.

2. An easel construction comprising a support for photographic paper having an upper planar support surface, a frame generally surrounding said surface, a plurality of opaque covers adapted to interfit in close contiguous relationship and substantially covers said surface and fill said frame, each of said covers being individually removably positioned in said close contiguous relationship on said planar support surface, lid means adapted to overlie said support surface to maintain said covers in tight assembled relation with said support surface to prevent relative movement of said covers and said support and means releaseably holding said lid adjacent said frame to maintain said covers in said tight assembled relation irrespective of the position of said support.

3. The easel of claim 2 in which said lid means comprises an opaque lid hinged along one edge of said support.

4. The easel of claim 2 in which said securing means comprises an opaque plate slidably movable over said covers in retaining grooves formed in said support.

5. The easel construction of claim 2 wherein each of said covers has a first surface and a distinctively different second surface whereby said cover may be placed in said frame in an inverted position and inversion of said cover provides tactile indication of exposure of the sensitive material thereunder.

6. The easel construction of claim 5 wherein each of said covers is provided with handle means on one surface thereof to facilitate manual removal from the frame and inversion, said handle means providing a tactile indication of cover position and consequent exposure of the support surface thereunder.

7. The easel construction of claim 6 wherein said frame, said support and said covers are formed from deformable thermoplastic sheet material.

8. An easel construction comprising a rectangular frame having upwardly sloping, converging sides with said sides having downwardly extending vertical terminal edge portions in a normal position of easel use; a base receivable within said frame having a paper support surface spaced beneath two opposed terminal edge portions of said frame so as to define parallel slots therewith adjacent opposed edges of said support surface, outer peripheral portions of said base being secured to lower, inner peripheral portions of said frame, opaque cover means adapted to rest on said support surface in close-fitting relation with no interval therebetween and snugly receivable within the frame opening defined by said terminal edge portions, and releasable means connected to said frame for maintaining said covers in tight, assembled relation with said frame and base when said construction is inverted.

9. An easel construction comprising a support for photographic paper having an upper planar support surface, a frame surrounding said surface, a plurality of opaque covers adapted to interfit in close contiguous relationship and substantially cover said surface and fill said frame, each of said covers being individually removably positioned in said close contiguous relationship on said planar support surface, said covers being rectangular and related to one another in size whereby the smallest cover is substantially equal to an area $1/2^n$ of the area defined by the frame and from one to $2^n$ prints may be produced in a single printing and processing operation wherein $n$ is any integer.

10. The easel construction of claim 9 in which indicia are outlined on an outer surface of said base oppositely disposed to said support surface, said indicia defining precisely areas defined by said opaque covers.

11. The easel construction of claim 9 in which said planar support surface and said outer surface of said base and equidistant from an easel support surface when said base surfaces are arranged uppermost and said easel is resting on said easel support surface.

12. The easel construction of claim 9 in combination with paper-retaining projections secured to said base and positioned adjacent said base outer surface whereby a sheet of photographic paper may be locked in position over said support surface.

13. A method of exposing photographic prints comprising the steps of:
 a. providing a photographic light image on a reproduction surface;
 b. disposing a sheet of photographically sensitive material on said reproduction surface, the size of said sheet being substantially greater than the image to be reproduced;
 c. covering said sheet with a plurality of individual opaque covers, at least one of which corresponds to the size of the image to be reproduced;
 d. removing said one cover to expose a selected area of said sensitive material;
 e. replacing said one cover in a unique manner which distinguishes it from the covers which have not been removed;
 f. and removing and replacing each of said covers in turn while moving said image relative to said sheet until substantially the entire sensitive sheet has been exposed to said image.

14. The method of claim 13 wherein said sheet is a standard available sheet of photographic paper, two of said covers have an area equal to approximately one-half of said sheet, four covers are equal to one-quarter of said sheet and eight covers are each equal to one-eighth of said sheet whereby the entire sheet is covered and can be exposed to as many as eight separate images.

15. The method of claim 13 wherein each of said covers is inverted to expose the opposite surface to provide a unique distinction between the position of said cover before and after exposure of the area of the sheet thereunder.

16. The method of claim 13 including the additional steps of:
 g. processing the exposed sensitive sheet and
 h. cutting the sheet to separate the individual images and form separate individual prints.

17. The method of claim 16 in combination with the step of preliminarily focusing the image of a negative to be printed on said paper at the precise level of the light-sensitive surface of said photographic paper and of the precise size desired whereby a focused image of appropriate size and location is present when a cover is removed for exposing the light-sensitive surface therebeneath.

* * * * *

UNITED STATES PATENT OFFICE
CERTIFICATE OF CORRECTION

Patent No. 3,829,211          Dated August 13, 1974

Inventor(s) ROBERT W. MITCHELL

It is certified that error appears in the above-identified patent and that said Letters Patent are hereby corrected as shown below:

Col. 2, lines 31, 32 "continguous" should be --contiguous--

Col. 3, line 35 "then" should be --thus--

Col. 4, line 60 "vacuum holding" should be --vacuum molding--

Col. 7, line 20 "and equidistant" should be -- are equidistant--

Signed and sealed this 3rd day of December 1974.

(SEAL)
Attest:

McCOY M. GIBSON JR.           C. MARSHALL DANN
Attesting Officer          Commissioner of Patents

UNITED STATES PATENT OFFICE
CERTIFICATE OF CORRECTION

Patent No. 3,829,211                Dated August 13, 1974

Inventor(s) ROBERT W. MITCHELL

It is certified that error appears in the above-identified patent and that said Letters Patent are hereby corrected as shown below:

Col. 2, lines 31, 32 "continguous" should be --contiguous--

Col. 3, line 35 "then" should be --thus--

Col. 4, line 60 "vacuum holding" should be --vacuum molding--

Col. 5, line 56, 2" should be $--2^n--$

Col. 7, line 10, 1/2" should be $--1/2^n--$

Col. 7, line 11, 2" should be $--2^n--$

Col. 7, line 20 "and equidistant" should be -- are equidistant--

Signed and sealed this 29th day of April 1975.

(SEAL)
Attest:

RUTH C. MASON
Attesting Officer

C. MARSHALL DANN
Commissioner of Patents
and Trademarks